(12) United States Patent
Maguire et al.

(10) Patent No.: US 7,007,425 B2
(45) Date of Patent: Mar. 7, 2006

(54) TANGLE FREE FISHING POLE

(75) Inventors: Mark R. Maguire, Fort Wayne, IN (US); Cynthia A Maguire, Fort Wayne, IN (US); Daniel E. Morken, 6331 Tolbert Ct., Fort Wayne, IN (US) 46804; Rebecca L Morken, Fort Wayne, IN (US)

(73) Assignee: Daniel E. Morken, Fort Wayne, IN (US)

( * ) Notice: Subject to any disclaimer, the term of this patent is extended or adjusted under 35 U.S.C. 154(b) by 0 days.

(21) Appl. No.: 09/982,635

(22) Filed: Oct. 18, 2001

(65) Prior Publication Data

US 2003/0074826 A1  Apr. 24, 2003

(51) Int. Cl.
*A01K 87/04*  (2006.01)
(52) U.S. Cl. .................................................. 43/24
(58) Field of Classification Search ............... 43/18.1, 43/24, 25
See application file for complete search history.

(56) References Cited

U.S. PATENT DOCUMENTS

| | | | | |
|---|---|---|---|---|
| 2,394,706 A | * | 2/1946 | Makie | 43/18.1 |
| 2,484,727 A | * | 10/1949 | Patterson | 43/24 |
| 2,652,654 A | | 9/1953 | Bahn | 43/24 |
| 2,781,602 A | * | 2/1957 | Warford | 43/24 |
| 2,880,546 A | * | 4/1959 | Pemberton | 43/24 |
| 3,279,116 A | | 10/1966 | Chapman | 43/23 |
| 3,432,958 A | | 3/1969 | Bellinger | 43/24 |
| 3,513,582 A | * | 5/1970 | Carabasse | 43/18.1 |
| 3,972,144 A | | 8/1976 | Geisler | 43/26 |
| 4,212,126 A | * | 7/1980 | Barnett | 43/24 |
| 4,702,031 A | | 10/1987 | Sousa | 43/17 |
| 4,996,789 A | * | 3/1991 | Hoover | 43/24 |
| 5,832,653 A | | 11/1998 | Tsurufuji | 43/24 |
| 5,934,005 A | * | 8/1999 | Utsuno et al. | 43/24 |
| 6,050,021 A | * | 4/2000 | Yasui et al. | 43/24 |
| 6,230,423 B1 | | 5/2001 | Blank | 43/24 |

FOREIGN PATENT DOCUMENTS

| | | | | |
|---|---|---|---|---|
| FR | 1418726 | * | 10/1965 | 43/24 |
| GB | 10745 | * | 5/1899 | 43/25 |
| GB | 306594 | * | 2/1929 | 43/24 |

* cited by examiner

*Primary Examiner*—Kurt Rowan
(74) *Attorney, Agent, or Firm*—Taylor & Aust, P.C.

(57) ABSTRACT

A fishing pole enhancement kit includes an elongated tube configured to be disposed through at least two fishing line guides and two captivating devices configured to be detachably connected to an end of the elongated tube.

9 Claims, 2 Drawing Sheets

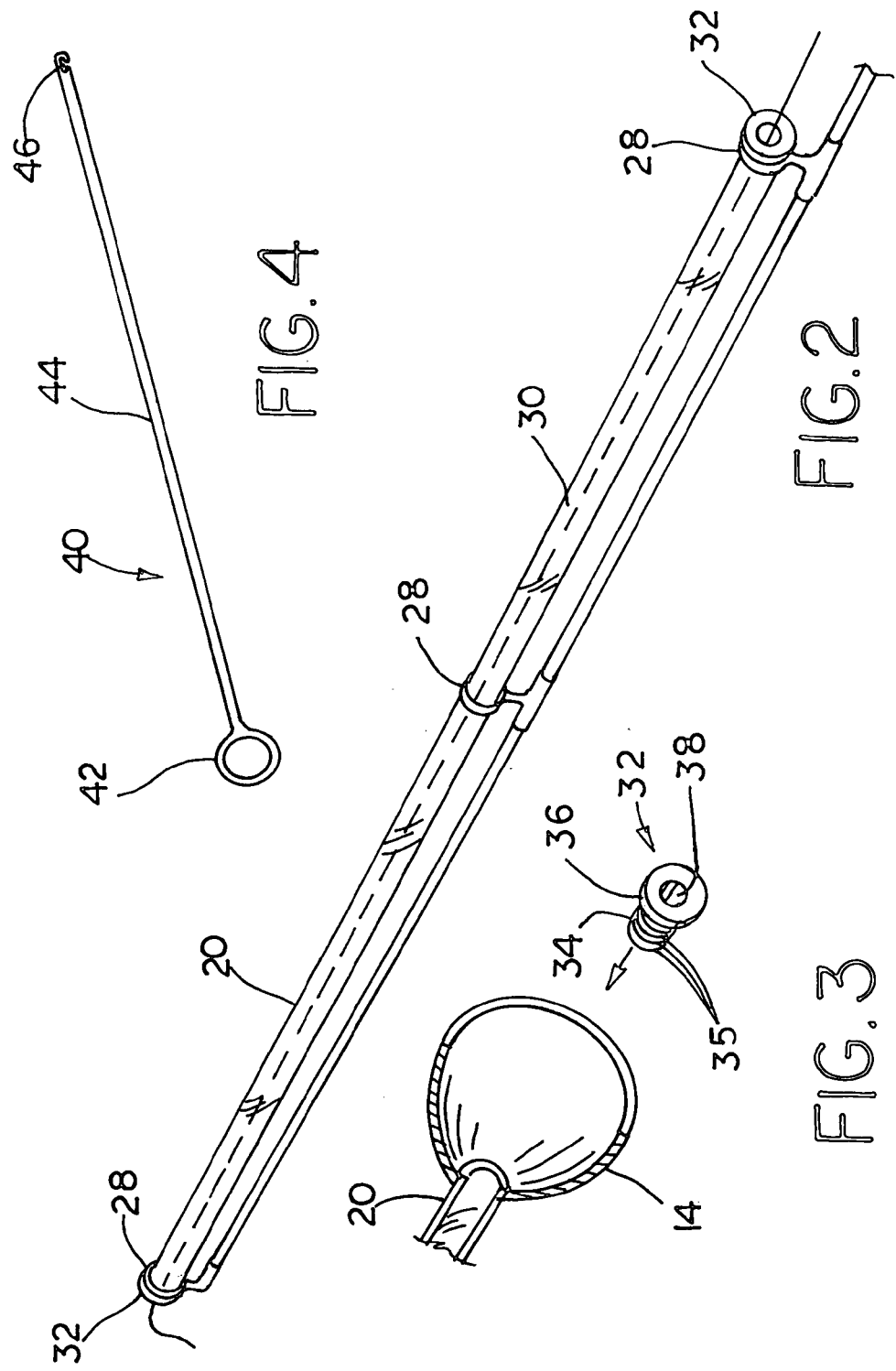

TANGLE FREE FISHING POLE

BACKGROUND OF THE INVENTION

1. Field of the Invention

The present invention relates to a fishing pole, and, more particularly, to a tangle free fishing pole.

2. Description of the Related Art

Mankind has pursued fishing for survival, for commercial purposes and for sport. The pursuit of the sport of fishing has produced a plethora of products in the way of boating innovations, fish finders, lures, fishing lines, reels and fishing rods.

The basic equipment of fishing consists of a barbed metal hook at the end of a filament, woven line or metal line and a wood, fiberglass or metal rod or pole, that usually has some type of spool or reel, near the handle around which the fishing line is wound. Recreational fishing is practiced throughout the world and is done in freshwater and saltwater. The most popular game fish are salmon, trout, bass and pike in freshwater, and sailfish, tuna, marlin, tarpon and bonefish in saltwater. There are two basic types of freshwater tackle, those for fly casting and those for bait casting.

Live bait or a variety of plugs, spoons, and other artificial lures can be cast and pulled in, popped along the surface, trolled from a moving boat or allowed to rest near the bottom. Spinning tackle, which is also very popular, requires the angler to keep the lure moving by repeatedly casting the spinning tackle and reeling it back in.

Fishing poles, which are configured for bait casting, generally have a reel with some device to release fishing line from the reel as the pole is moved through a casting motion. The mass of the lure, bait and/or other tackle secured to the end of the fishing line is utilized during the casting motion, by way of the inertia imparted, to pull the line from the reel to a point of entry in the water. A skilled fisherman can accurately cast the fishing pole to place the lure in a desired location.

A fisherman experiences a great deal of annoyance when his fishing line tangles, but particularly when it tangles on the fishing rod. Twisting and tangling of fishing line most often occurs as a person is preparing to cast or during the casting process. Excessive slack in the fishing line also contributes to a tangling problem. Even though novice fishermen are most adept at tangling their fishing line, every angler has experienced the problem. Particularly frustrating to the experienced angler is fishing with a novice who requires repeated attention to untangle fishing line from their fishing pole.

What is needed in the art of fishing is an apparatus to eliminate the tangling of fishing line.

SUMMARY OF THE INVENTION

The present invention provides a tangle free fishing pole having a flexible tube, captivated between fishing line guides, for the routing of fishing line therethrough.

The invention comprises, in one form thereof, a fishing pole enhancement kit including an elongated tube configured to be disposed through at least two fishing line guides and two captivating devices configured to be detachably connected to an end of the elongated tube.

An advantage of the present invention is that it eliminates tangling of a fishing line on a fishing rod during the casting process.

Another advantage is that it eliminates tangling of fishing line during storage of a fishing rod.

Yet another advantage is that the present invention eliminates slack in the fishing line

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is an expanded side view of a portion of the tangle free fishing pole of FIG. 1;

FIG. 3 is a perspective view of a captivating device of the tangle free fishing pole of FIGS. 1 and 2, and a sectioned view of a part of a fishing reel to which the captivating device can be applied; and FIG. 4 is a side view of a lead line for use with the tangle free fishing pole of FIGS. 1–3.

DETAILED DESCRIPTION OF THE INVENTION

Figure 1:
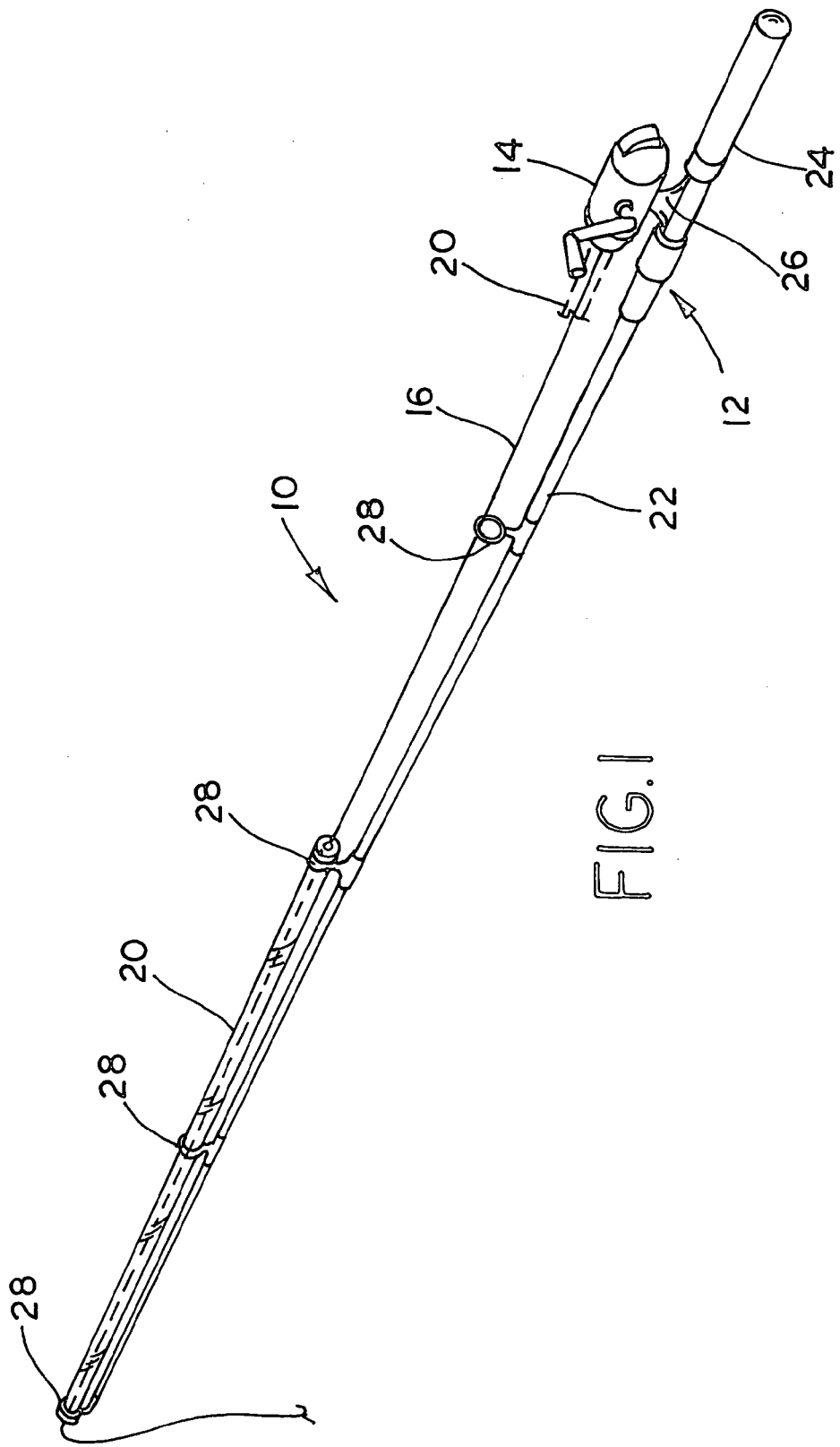
FIG. 1 is a side view of a tangle free fishing pole embodying the present invention.

Referring now to the drawings, and more particularly to FIGS. 1 and 2, there is shown a tangle free fishing pole 10 which generally includes a fishing rod 12, a reel 14, fishing line 16 and fishing line containment apparatus 20.

Fishing rod 12 includes shaft 22, handle 24, reel mount 26 and line guides 28. Shaft 22 is a flexible shaft which assists in the casting of fishing line 16 and provides tension on fishing line 16 during the retrieval of fishing line 16. The flexibility of shaft 22 is selected based on the type of fish sought and the fisherman's preferences. Handle 24 is attached to one end of shaft 22. Located at a position next to handle 24 is reel mount 26. Along the length of shaft 22 are located line guides 28. Line guides 28 are spaced to accommodate fishing line 16.

Handle 24 is attached to an end of shaft 22 to provide an ergonomic grip to the user of fishing rod 12. Handle 24 is cushioned and made of a slip resistant material. Reel mount 26 is mounted adjacent to handle 24 in order to place reel 14 proximate handle 24 thereby facilitating the use of reel 14 by the user. Line guides 28 are located along shaft 22 having openings therethrough to provide for the guiding of fishing line 16 along the length of shaft 22. Line guides 28 are well known in the art and are affixed to shaft 22.

Reel 14 is a casting type of reel which is configured to contain fishing line 16 for release upon a coordinated casting action and actuation of reel 14 by the user. Reel 14 is used to retrieve fishing line 16 and to store fishing line 16 thereon.

Fishing line 16 is a filament, a woven line or a metal line. Fishing line 16 is stored on reel 14 and released by a user in a casting motion to cast a bait or lure into water.

Fishing line containment apparatus 20 includes elongated tube 30 and captivating devices 32. Fishing line containment apparatus 20 can extend from any line guide 28 to any other line guide 28. Fishing line containment apparatus 20 provides for the passage of fishing line 16 therethrough. The passage of fishing line 16 through fishing line containment apparatus 20 controls the flow of fishing line 16, preventing the contact of the portion of fishing line 16 therein with another portion of fishing line 16, thereby eliminating tangling of fishing line 16.

Elongated tube 30 is a hollow tubing that is flexible such that the overall flexibility of fishing rod 12 is not substantially altered. Elongated tube 30 may be made of plastic, vinyl, fiberglass, rubber, graphite or metal. Elongated tube 30 may be transparent, translucent or opaque of any color and include glow in the dark compounds. The outer diameter of elongated tube 30 is such that it will pass through line guides 28. The length of elongated tube 30 is selected to proceed through as many line guides 28 as is desired. Each end of elongated tube 30 is secured to a line guide by captivating device 32 or elongated tube 30 may be captivated to shaft 22 in another manner thereby eliminating the need for line guides altogether. Alternatively, elongated tube 30 may be a coil spring. Alternatively, elongated tube 30 may have one end captivated to line guide 28 by way of a captivating device 32 and an other end routed to reel 14 and captivated thereto by an other captivating device 32 as shown by phantom lines in FIG. 1. Attaching elongated tube 30 to reel 14 also eliminates slack in line 16 ahead of reel 14.

Now, additionally referring to FIG. 3, captivating devices 32 are a ferrule 32 have a tubular section 34, a shoulder section 36 and an axial hole 38 therethrough. The ends of elongated tube 30 are disposed near the openings of line guides 28 and captivating devices 32 are attached to elongated tube 30 by going through line guides 28. Tubular section 34 is sized to be detachably inserted into elongated tube 30. Tubular section 34 has raised annular rings 35 on the outer surface to retain elongated tube 30. Alternatively, tubular section 34 may retain elongated tube 30 using a crimp or an adhesive. Shoulder section 36 is circular in shape and is sized to not pass through the opening of line guide 28. Axial hole 38 is cylindrical and is substantially centered on the axis of captivating device 32. Fishing line 16 travels through a captivating device 32, elongated tube 30 and an other captivating device 32.

In another embodiment of the present invention, there is provided a kit for the modification of a fishing rod, including elongated tube 30 and at least two captivating devices 32.

A user obtains the kit for installation on fishing rod 12. The user measures the needed length of elongated tube 30 and cuts elongated tube 30 to a desired length. An end of the properly sized elongated tube 30 is positioned next to a line guide 28 and from the opposite side of line guide 28 a captivating device 32 is inserted into elongated tube 30, thereby drawing an end of elongated tube 30 into the opening of a line guide 28. An other end of elongated tube 30 is routed through any intervening line guides 28 and an other captivating device 32 is inserted into elongated tube 30 thereby resulting in elongated tube 30 being secured on each end to a line guide 28 of fishing rod 12. Alternatively, one end of elongated tube 30 may be secured to reel 14 with a captivating device 32.

Now, additionally referring to FIG. 4, there is depicted lead line 40 which is another aspect of the present invention. Lead line 40 includes handle 42, body 44 and eyelet 46. Lead line 40 provides for the threading of fishing line 16 through fishing line containment apparatus 20. Lead line 40 is inserted through fishing line containment apparatus 20, fishing line 16 is threaded through eyelet 46 and lead line 40 is withdrawn from fishing line containment apparatus 20 thereby threading fishing line 16 through fishing line containment apparatus 20.

Handle 42 is a substantially circular loop allowing a user to conveniently grasp the end of lead line 40 and allows a user to attach lead line 40 to a cord (not shown) in order to prevent loss of lead line 40.

Body 44 is a substantially cylindrical element, of a diameter smaller than the interior diameter of elongated tube 30. Attached at one end of body 44 is handle 42 and at an other end of body 44 is eyelet 46.

Eyelet 46 is a hole through the side of body 44 toward an end of body 44 opposite handle 42. Eyelet 46 accommodates the threading of an end of fishing line 16 therethrough. Alternatively, eyelet 46 may also have a slot extending from eyelet 46 to the side of body 44, thereby allowing fishing line 16 to be inserted sideways into eyelet 46.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tangle free fishing pole, comprising:
   a fish pole having a plurality of fishing line guides mounted to an exterior surface of said fish pole including a first line guide positioned on a distal end of said fish pole, a second line guide and a third line guide each positioned on said exterior surface apart from said first line guide said fish pole having a first flexibility; and
   a fishing line containment apparatus installed through at least two of said plurality of fishing line guides;
   wherein said fishing line containment apparatus, includes:
      an elongated tube disposed through said first line guide, said second line guide and said third line guide, said elongated tube having a second flexibility, said second flexibility greater than said first flexibility; and
      two captivating devices each having a shoulder section of larger diameter than an inner diameter of said line guides and a tubular section having raised annular rings connected to said shoulder section, said tubular section adapted to be inserted into an end of said elongated tube, said captivating device having an axial hole there through for the passage of a fishing line one of said two captivating devices detachably connected to an end of said elongated tube, an other of said two captivating devices detachably connected to an other end of said elongated tube, said two captivating devices being in the same plane as said elongated tube.

2. The fishing pole of claim 1, wherein said elongated tube is flexible.

3. The fishing pole of claim 1, wherein said elongated tube is made of at least one of plastic, vinyl, fiberglass, rubber, graphite and metal.

4. The fishing pole of claim 1, wherein said elongated tube is a coiled spring.

5. The fishing pole of claim 1, wherein said two captivating devices each comprise a ferrule having annular rings on an exterior surface, said ferrule having a shoulder on an end thereof.

6. The fishing pole of claim 1, further comprising a fishing reel, said fishing line containment apparatus extending to said fishing reel.

7. The fishing pole of claim 1, wherein said elongated tube is positioned along side said exterior surface of said fish pole.

8. A method of enhancing a fishing rod, comprising the steps of:
   providing a fishing rod having a plurality of fishing line guides including a first fishing line guide, a second fishing line guide and a third fishing line guide, said fishing rod having a first flexibility;

positioning flexible tubing through said second fishing line guide between said first fishing line guide and said third fishing line guide, said flexible tubing having a second flexibility, said second flexibility greater than said first flexibility; and removably installing two captivating devices each having a shoulder section of larger diameter than an inner diameter of said line guides and a tubular section having raised annular rings connected to said shoulder section, said tubular section adapted to be inserted into an end of said elongated tube, said captivating device having an axial hole there through for the passage of a fishing line one said captivating device at each of two ends of said flexible tubing, one of said two captivating devices being proximate to said first fishing line guide and another of said two captivating devices proximate to said third fishing line guide, said flexible tubing in contact with said annular rings.

9. The method of claim 8, further comprising the steps of:

inserting said flexible tubing through at least one of said plurality of fishing line guides; and using a lead line to thread a fishing line through one said captivating device, said flexible tubing and an other said captivating device.

* * * * *

UNITED STATES PATENT AND TRADEMARK OFFICE
CERTIFICATE OF CORRECTION

| | | |
|---|---|---|
| PATENT NO. | : 7,007,425 B2 | Page 1 of 1 |
| APPLICATION NO. | : 09/982635 | |
| DATED | : March 7, 2006 | |
| INVENTOR(S) | : Maguire et al. | |

It is certified that error appears in the above-identified patent and that said Letters Patent is hereby corrected as shown below:

COLUMN 2
    At line 22, please insert the following paragraph:
    --Corresponding reference characters indicate corresponding parts throughout the several views. The exemplifications set out herein illustrate one preferred embodiment of the invention, in one form, and such exemplifications are not to be construed as limiting the scope of the invention in any manner.--

COLUMN 3
    At line 19, after "ferrule" and before "have", please delete "32"; and At line 25, after "rings" and before "on", please delete "35".

COLUMN 4
    At line 54, please delete Claim 5, and substitute therefore former Claim 8, as follows:
    --5. The fishing pole of claim 1, further comprising a lead line for withdrawable insertion through said fishing line containment apparatus.--

Signed and Sealed this

Tenth Day of June, 2008

JON W. DUDAS
*Director of the United States Patent and Trademark Office*